Feb. 8, 1966  W. J. MAUCHLINE  3,233,563
AUTOMOBILE FOOD AND DRINK TRAY
Filed Sept. 22, 1964
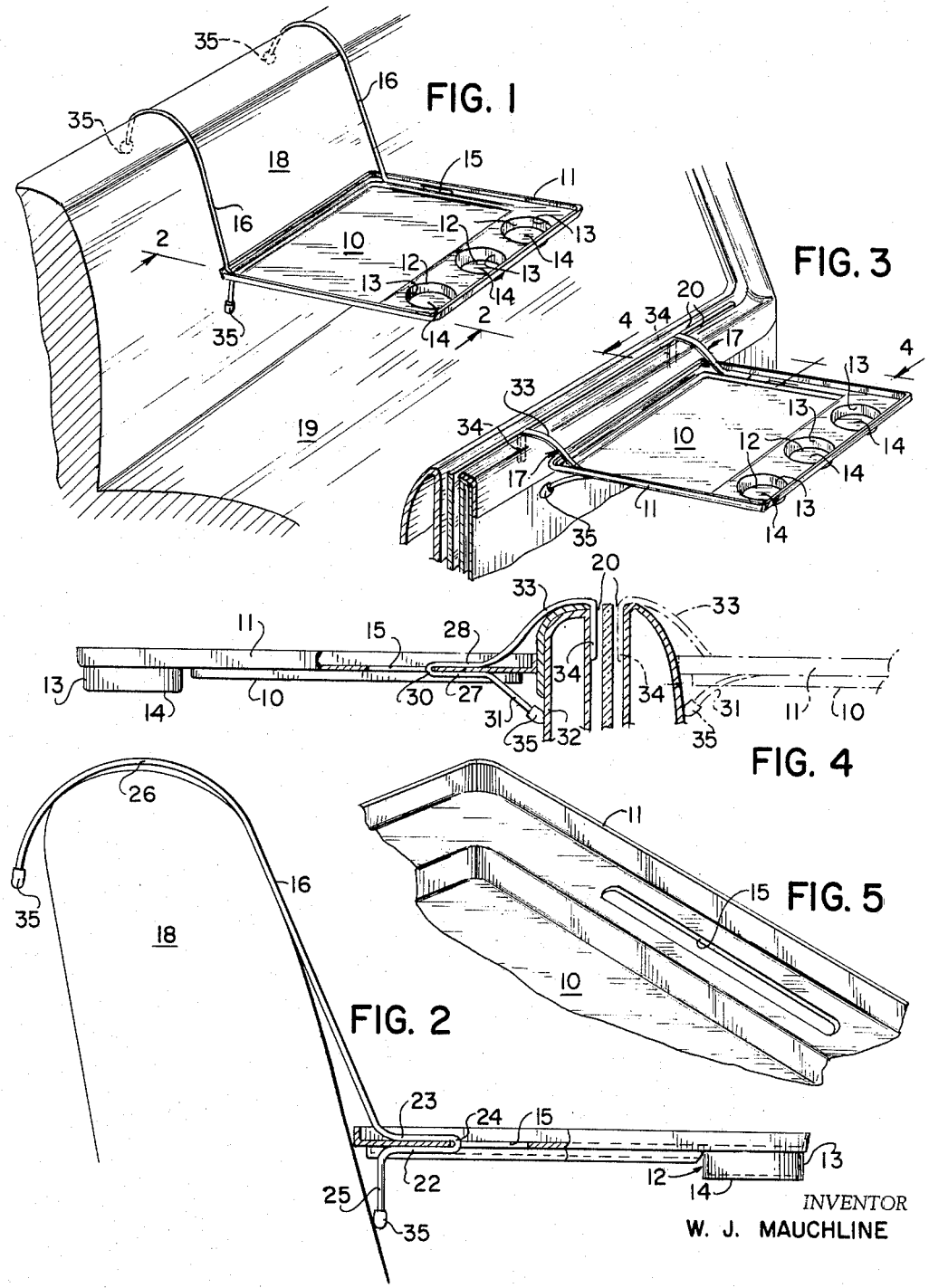
INVENTOR
W. J. MAUCHLINE
ATTORNEYS

3,233,563
AUTOMOBILE FOOD AND DRINK TRAY
William J. Mauchline, Rocky Mount, N.C., assignor to Associated Products, Inc., Rocky Mount, N.C.
Filed Sept. 22, 1964, Ser. No. 398,333
4 Claims. (Cl. 108—44)

This invention relates to devices of various kinds used to complement means of the users in the pursuit of planned activities involving moving from place to place and the supplying of human needs including food and drink so necessary to the sustenance of the human body.

The invention relates particularly to an automobile food and drink tray employed in the serving of various and sundry foods to occupants of automobiles at the windows and within the automobile at roadside stations and the like, the use of which makes it unnecessary for the persons being served food and drink to get out of the automobile, thus effecting saving in time.

Various and sundry types of devices have been provided for the serving of food to the occupants of automobiles and the like at roadside stands and other places, some of which devices have been more satisfactory than others, but all of which have been subject to criticism for one reason or another, including lack of stability, cost, clumsiness, fragility, and inability to be collapsed and compactly stored.

It is an object of the invention to provide an automobile food and drink tray of simple, inexpensive, practical, and durable construction with means whereby such tray can be installed and removed with ease and which when installed will provide a solid satisfactory support for food and drink, and which tray can be supported without fear of collapse on the door or window, at either side of the window glass without interfering with the latter, or the tray can be supported over the seat of the automobile either front or back, as well as a tray and supporting means therefor which can be readily disposed in a compact package in a manner to occupy a minimum of space for storage or other purposes.

Another object of the invention is to provide a tray of sturdy, relatively rigid construction with openings for receptacles, and the material of the tray about such openings serving to provide reinforcement for the body of the tray and with supports readily applicable to parts of the automobile including the window and seat portions thereof and which supports, although of relatively rigid construction, can be deformed slightly to conform to the configuration of the portion of the automobile to which they are applied.

Other objects and advantages of the invention will be apparent from the following description considered in conjunction with the accompanying drawing wherein:

FIG. 1 is a perspective illustrating one application of the invention applied to the seat of an automobile;

FIG. 2, a section on the line 2—2 of FIG. 1;

FIG. 3, a perspective of the invention applied to the window well of an automobile;

FIG. 4, a side elevation of a portion in section along the line 4—4 of FIG. 3; and FIG. 5, an enlarged fragmentary perspective of one corner of the tray revealing the elongated slot.

Briefly stated the automobile food and drink tray of the present invention comprises a generally flat tray body of generally rectangular configuration with an annular upstanding article retaining and reinforcing rim, with openings or recesses along one edge portion of the same having annular wall portions substantially at right angles to the body of the tray which serve not only as receptacles for food and drink containers and other articles, but likewise to reinforce the tray. The tray also is provided at opposite sides with slots for the reception of mounting brackets or supports, such mounting brackets each including a pair of straight portions with a connecting portion or bight which spaces the straight portions apart in generally parallel relation a distance that when applied to the tray with the tray will be solidly gripped on both surfaces. The mounting bracket or support has a relatively short depending portion and has an upwardly extending curved portion adapted to hook over the back of a seat, such upwardly extending curved portion having a full radius to assure supporting engagement at spaced locations with the back of the seat.

In order to support the tray either exteriorly or interiorly of a window a slightly modified type of hanger is provided which has a depending portion for engaging the side of the structure on which it is mounted and a rounded portion for hooking over the portion of the structure beside the window, the extremity of the rounded portion having a loop designed to be inserted beside the window glass regardless of whether it is in open or closed position. With the first described hanger structure wire or rod stock preferably is employed, due to its lower cost, while flat stock preferably will be employed for the smaller hanger.

With continued reference to the drawing the automobile food and drink tray of the present invention comprises a generally flat tray body 10 preferably of a generally rectangular configuration with an annular upstanding reinforcing and article retaining rim 11.

The tray body may have openings or recesses 12 each preferably having an annular wall 13 along one edge portion of the same each with a bottom 14 so that containers for food or drink may be held therein. The annular wall portions 13 which form the openings or recesses are located substantially at right angles to the body of the tray and consequently serve to reinforce and add strength to the tray.

The tray body 10 is provided at opposite sides with a slot 15 for the reception of mounting brackets or supports 16 and 17 for supporting the tray from either the back 18 of a seat 19 or in a window well 20. The supports 16 fit over the back while the support 17 has a downward extremity which enters the window well 20.

The mounting brackets which support the tray from a seat include a pair of underlying and overlying straight portions 22 and 23, respectively, with a connecting portion or bight 24 which serves to space the straight portions apart in generally parallel relation a distance to receive therebetween the tray body 10 in a manner that the latter will be solidly gripped on both its bottom and top surfaces, thus providing a solid connection between the mounting bracket 16 or support and the tray 10. The mounting bracket or support 16 has a relatively short depending portion 25 and an upwardly extending curved or hook portion 26 adapted to hook over the back of the seat 18, the upstanding portions of such pair of brackets 16 being generally parallel. Also the curved portions 26 have a full radius to assure supporting engagement with opposite sides of the back of the seat 18 of an automobile.

In order to support the tray exteriorly or interiorly of a window a slightly modified type of hanger 17 is provided preferably of flat stock. Such hanger has spaced underlying and overlying straight portions 27 and 28, respectively, which engage the top and bottom surfaces of the tray 10 and a bright or connecting portion 30. This hanger also has a depending portion 31 for engaging the surface 32 of the structure on which it is mounted as well as a rounded portion 33 which extends into the window, the extremity 34 of such rounded portion being designed to be inserted beside the window glass into the window well regardless of whether such window glass is in open or closed position. The hanger structure for mounting the tray from the back of the seat may be of wire or rod stock since the same is less expensive, although the invention is not limited thereto, while flat stock preferably will be employed for the window hanger although, likewise, the invention is not limited thereto. The ends of the hangers 16 and 17 preferably are provided with protective caps 35 to prevent injury to person or property.

It will be apparent from the foregoing that an automobile food and drink tray is provided of relatively simple, inexpensive, practical, rigid and durable construction and that hanger or support means is provided therefor of like character. Also the tray and hanger may be disposed in collapsed position for easy shipment and storage and readily may be installed and removed by the unskilled and will provide a satisfactory solid support for articles of food and drink.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. An automobile food and drink tray comprising a generally flat rectangular tray body having openings therein along one side edge portion, each opening being defined by upright wall structure, which reinforces said tray body, and a bottom, each opening being of a size to receive articles therein, said tray body having an annular marginal upstanding reinforcing and retaining rim and having spaced slots in said tray body beside said rim, one at each side of said tray body close to said rim, for the reception of an inserted mounting bracket in a manner to bear against and provide solid contact with said rim, spaced mounting brackets one for each side of said tray body, each mounting bracket having spaced straight portions and a connecting bight portion with said straight portions disposed in the proper spaced relation to firmly engage opposite surfaces of said tray body, said mounting bracket having a depending portion for engagement with a support and another upwardly extending portion reversely curved to provide loop portions for engagement over a support.

2. An automobile food and drink tray comprising a generally flat rectangular tray body having openings therein along one side edge portion, said tray body having an annular marginal upstanding reinforcing and retaining rim and having spaced slots in said tray body beside said rim, one at each side of said tray body close to said rim, for the reception of an inserted mounting bracket in a manner to bear against and provide solid contact with said rim, spaced mounting brackets one for each side of said tray body, each mounting bracket having spaced straight portions and a connecting bight portion with said straight portions disposed in the proper spaced relation to firmly engage opposite surfaces of said tray body, said mounting bracket having a depending portion for engagement with a support and another upwardly extending portion reversely curved to provide loop portions for engagement over a support.

3. The structure of claim 1 in which said mounting brackets have curved portions applicable over a support.

4. The structure of claim 1 in which said mounting brackets are of a configuration to fit into a window well of an automobile.

References Cited by the Examiner

UNITED STATES PATENTS

| 2,593,222 | 4/1952 | Tracy | 108—46 X |
| 2,680,523 | 6/1954 | Heeter | 108—44 |
| 2,763,378 | 9/1956 | Black | 108—47 X |
| 2,817,566 | 12/1957 | Herman | 108—149 X |
| 2,889,051 | 6/1959 | Kramer | 211—74 |
| 3,052,506 | 9/1962 | Thomas | 108—46 |
| 3,125,969 | 3/1964 | Tallent | 108—46 |

FRANK B. SHERRY, *Primary Examiner.*